United States Patent [19]

Bellare et al.

[11] Patent Number: 5,673,319
[45] Date of Patent: Sep. 30, 1997

[54] BLOCK CIPHER MODE OF OPERATION FOR SECURE, LENGTH-PRESERVING ENCRYPTION

[75] Inventors: Mihir Bellare, New York, N.Y.; Phillip W. Rogaway, Davis, Calif.

[73] Assignee: International Business Machines Corporation, Austin, Tex.

[21] Appl. No.: 384,152

[22] Filed: Feb. 6, 1995

[51] Int. Cl.⁶ .................................................... H04L 9/08
[52] U.S. Cl. ........................................ 380/25; 380/37
[58] Field of Search ...................... 380/4, 21, 25, 380/28, 37

[56] References Cited

U.S. PATENT DOCUMENTS

| | | | |
|---|---|---|---|
| 3,958,081 | 5/1976 | Ehrsam et al. | 380/25 |
| 4,074,066 | 2/1978 | Ehrsam et al. | 380/37 |
| 4,319,070 | 3/1982 | Best | 380/25 |
| 4,322,576 | 3/1982 | Miller . | |
| 4,751,733 | 6/1988 | Delayaye et al. | 380/37 |
| 4,910,776 | 3/1990 | Dyke | 380/25 |
| 4,982,429 | 1/1991 | Takaragi et al. | 380/28 |
| 5,063,596 | 11/1991 | Dyke | 380/25 |
| 5,068,895 | 11/1991 | Shimada | 380/28 |
| 5,109,413 | 4/1992 | Comerford et al. | 380/4 |
| 5,184,125 | 2/1993 | Weng . | |
| 5,196,840 | 3/1993 | Leigh et al. | 380/21 |
| 5,297,208 | 3/1994 | Schlafly et al. | 380/25 |
| 5,319,710 | 6/1994 | Atalla et al. | 380/25 |
| 5,491,749 | 2/1996 | Rogaway et al. | 380/25 |
| 5,491,750 | 2/1996 | Bellare et al. | 380/25 |

*Primary Examiner*—Salvatore Cangialosi
*Attorney, Agent, or Firm*—David H. Judson; Jeffrey S. LaBaw

[57] ABSTRACT

A method for encrypting a plaintext string into ciphertext begins by cipher block chaining (CBC) the plaintext using a first key and a null initialization vector to generate a CBC message authentication code (MAC) whose length is equal to the block length. The plaintext string is then cipher block chained again, now using a second key and the CBC-MAC as the initialization vector, to generate an enciphered string. The CBC-MAC and a prefix of the enciphered string comprising all of the enciphered string except the last block are then combined to create the ciphertext. The described mode of operation is length-preserving, yet has the property that related plaintexts give rise to unrelated ciphertexts.

20 Claims, 3 Drawing Sheets

BLOCK CIPHER MODE OF OPERATION FOR SECURE, LENGTH-PRESERVING ENCRYPTION

TECHNICAL FIELD

The present invention relates generally to secure communications and more particularly to computer-implemented methods to encrypt plaintext into ciphertext.

BACKGROUND OF THE INVENTION

It has been generally accepted that encryption schemes exhibiting certain properties are often desirable. The first of these properties is that the encrypting and decrypting operations are deterministic, as opposed to probabilistic, because in many environments there is no available or trustworthy source of randomness. It is also desirable that the scheme be history-free (not stateful) so that parties need not store a message counter or other information that must be updated after each encryption or decryption. The scheme should also be "secure" in that it effectively hides all information about the plaintext. Lastly, it is desired that the scheme be length-preserving, i.e. the length of the ciphertext should equal the length of the plaintext.

Block ciphers are well-known cryptographic tools that are often used to implement general encryption schemes. A block cipher is a symmetric key cryptosystem that transforms message (plaintext) blocks of fixed length (of "l" bits) into ciphertext blocks of the same length under the control of a key (of "k" bits). A widely used block cipher is provided by the U.S. Standard DES algorithm, which has l=64 and k=56, and is described in NBS FIPS Pub 46, titled "Data Encryption Standard", National Bureau of Standards, U.S. Department of Commerce, January 1977. Block ciphers like DES provide a way to encrypt a single block (e.g., 64-bits) of text. But to encrypt longer messages, the block cipher must be used in some "mode of operation." Many such modes of operation have been described in the prior art, with the most widely used one being Cipher Block Chaining (CBC). CBC is described in NBS FIPS Pub 81, titled "DES Modes of Operation", National Bureau of Standards, U.S. Department of Commerce, December 1980. CBC and other known modes, however, are either length-increasing or suffer from the weakness that distinct related plaintexts give rise to related ciphertexts. Many application domains that cannot tolerate the former have their security effectively compromised by the latter.

Cipher Block Chaining (CBC) requires the use of a secret key as well an "initialization vector" (IV). With an l-bit IV (the value of which is sent with the message or is otherwise known by both communicating parties), a string $x=x_1 \ldots x_n$ (consisting of n blocks, each of l bits) is then encrypted as $E_{a,IV}(x)=y_1 \ldots y_n$, where $y_0=IV$ and $y_i=f_a(x_i \oplus y_{i-1})$. In a CBC scheme, the first block of the ciphertext depends on the first block of the plaintext, the second block of the ciphertext depends on the first two blocks of the plaintext, and so on, with the last block of the ciphertext depending on all of the blocks of the plaintext. Such encryption, however, has a well-known drawback in that it is not secure enough when IV is fixed.

In particular, the CBC method often "leaks" information about plaintexts that are being encrypted. For example, if an adversary sees $E_{a,IV}(X)$ and $E_{a,IV}(X')$, and notices that they agree in the first j blocks, then the adversary can infer that X and X' also agree in the first j blocks. Such deficiencies are quite problematic. Thus, suppose that a file consisting of a sequence of 1 KByte employee records is noticed to have just changed from the 7th record on. Perhaps it is known a priori that the reason for this change was the update of an employee record due to someone having been demoted. If the underlying encryption method is $E_{a,IV}$, and the employee records are in alphabetical order by employee name, then one can infer that the affected employee is the 7th one in alphabetical order.

The above-described characteristic of CBC encryption to "leak" information about plaintexts could be addressed by choosing the initialization vector IV at random and then sending it along with the message. However, when this is done the scheme is no longer length-preserving. Alternatively, the encryption of a message could be made history-dependent (e.g., by using IV as a function of a message counter and not sending IV with the message); but this approach is also unsatisfactory because it is intolerant of non-receipt of messages by the intended recipient.

Thus, prior art encryption techniques that use block ciphers are undesirable in that they are length-increasing, intolerant of messages being dropped, or leak information about related plaintexts. There remains a need to provide a secure, length-preserving encryption scheme using block ciphers that overcomes these and other problems in the art.

BRIEF SUMMARY OF THE INVENTION

It is therefore a principal object of the invention to provide a method of encrypting a plaintext string that is deterministic and history-free.

It is another object of the invention to provide a block cipher mode of operation for encryption wherein the length of the ciphertext is the same as the length of the plaintext being encrypted.

It is another specific object of the invention to provide such a length-preserving encryption scheme that does not leak information about plaintexts that are being encrypted.

It is another particular object of the invention to provide a message encryption scheme that is history-free, so that parties do not store a message counter or other information that must be updated after each encryption or decryption.

It is a further specific object of the invention to provide a length-preserving encryption scheme based on a novel application of Cipher Block Chaining (CBC) and that overcomes the known security and information leakage problems associated with CBC encryption. This technique is highly advantageous in that modification of a ciphertext message to a ciphertext message not yet seen produces the encryption of an underyling message unrelated to those then seen.

It is a further object of the invention to provide new and nonobvious methods of encrypting plaintext message strings that have lengths that are multiples of or fractions of a block length.

These and other objects of the invention are achieved in a method, using first and second secret keys, to encrypt a plaintext string to a ciphertext string. The method begins by cipher block chaining the plaintext string using the first key and a fixed initialization vector to generate a CBC message authentication code (CBC-MAC) of length equal to the block length. Thereafter, the method continues by cipher block chaining the plaintext string using the second key, and using the aforementioned CBC message authentication code as the initialization vector, to thereby generate an enciphered string. The CBC message authentication code and a prefix of the enciphered string are then combined (typically by concatentation) to form the ciphertext string. Preferably, the technique is length-preserving; the prefix includes all but the final block so that the length of the ciphertext is equal to the length of the plaintext.

Thus according to the preferred method the plaintext string is processed using CBC twice, first to generate the CBC-MAC, and then to generate a portion of the ciphertext itself. In the first pass, the initialization vector used in the CBC is the null vector (meaning a string of 0-bits having length equal to the block length). In the second pass, the initialization vector is the CBC-MAC generated in the first pass. The keys are distinct for the two passes. The method is useful for generating ciphertext when the plaintext string has a length that is a multiple of a length of a block. A variant of the scheme can be used when the plaintext string has a length that is a fraction of the block length.

To decrypt the ciphertext, the enciphered string portion thereof is cipher block chained using the second key and the CBC-MAC as the initialization vector to generate a deciphered string. The deciphered string is then cipher block chained using the first key and a null IV to generate a string having a last block. The plaintext is then taken as the combination (e.g., by concatenation) of the deciphered string and a predetermined function (e.g., an XOR) of the last block, and the inverse of the block cipher under the first key at the CBC-MAC.

Another object of the invention is to implement such methods in a programmed computer or in dedicated hardware or software. In one embodiment, the various methods of the invention may be implemented on a program storage device (e.g., a floppy diskette) that is readable by a processor and that tangibly embodies a program of instructions executable by the processor to perform the various process steps of each method.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
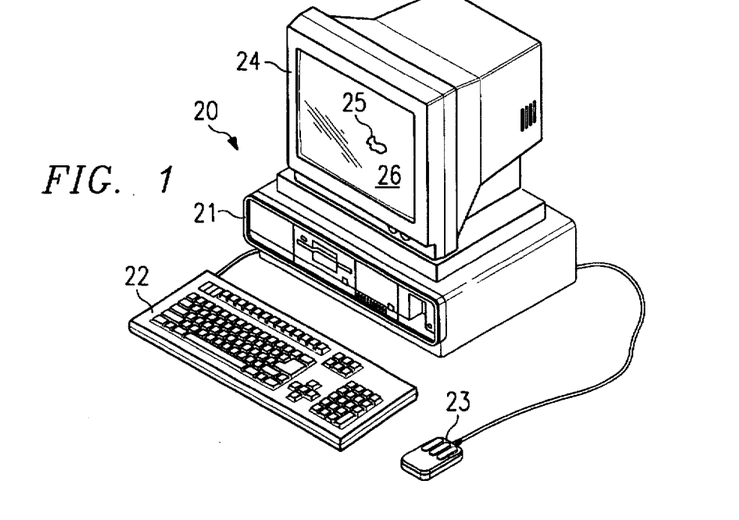
FIG. 1 illustrates a computer comprising a system unit, a keyboard, a mouse and a display, for use in implementing the encryption and decryption methods of the present invention.

By way of brief background, a computer for use in supporting the invention is shown in FIG. 1. The computer 20 comprises a system unit 21, a keyboard 22, a mouse 23 and a display 24. The screen 26 of display device 24 is used to present a graphical user interface (GUI). The graphical user interface supported by the operating system allows the user to use a point and shoot method of input, i.e., by moving the mouse pointer 25 to an icon representing a data object at a particular location on the screen 26 and pressing on the mouse buttons to perform a user command or selection.

Figure 2:
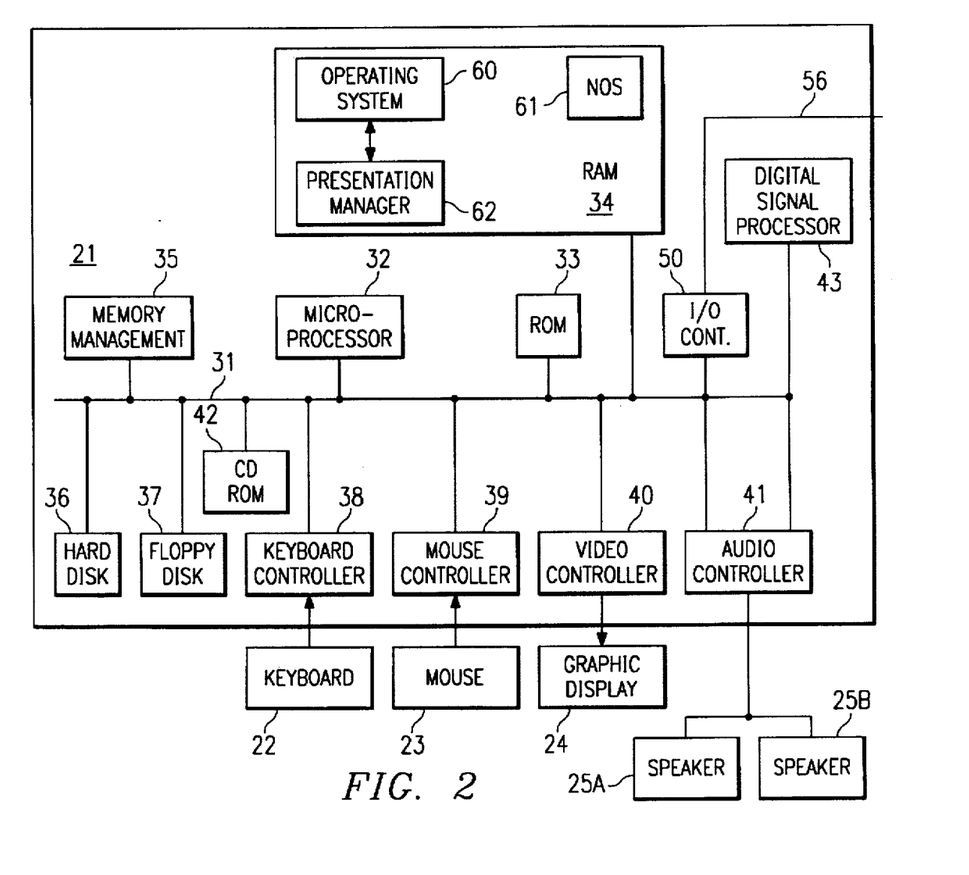
FIG. 2 is an architectural block diagram of the computer illustrated in FIG. 1.

FIG. 2 shows a block diagram of the components of the personal computer shown in FIG. 1. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM PS/2 series of computers is one of the Intel family of microprocessors including the 386 or 486 microprocessors. Other microprocessors, including but not limited to, Motorola's family of microprocessors such as the 68000, 68020 or the 68030 microprocessors and various RISC microprocessors such as the PowerPC™ microprocessor manufactured by IBM, and others made by Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over the local area network 56 to other similarly configured data processing systems.

One of the preferred implementations of the present invention is as a set of instructions in a code module resident in the random access memory 34. Until required by the computer system, the set of instructions may be stored in another computer memory, for example, in the hard disk drive 36, or in a removable memory such as an optical disk for eventual use in the CD ROM 42 or a in a floppy disk for eventual use in the floppy disk drive 37. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, the inventive method is designed to be implemented on a computer such as shown in FIG. 1 although it should be appreciated that the word "computer" is to be afforded its broadest scope and meaning to include any type of device or part thereof that provides a computing functionality regardless of the particular application.

Figure 3:
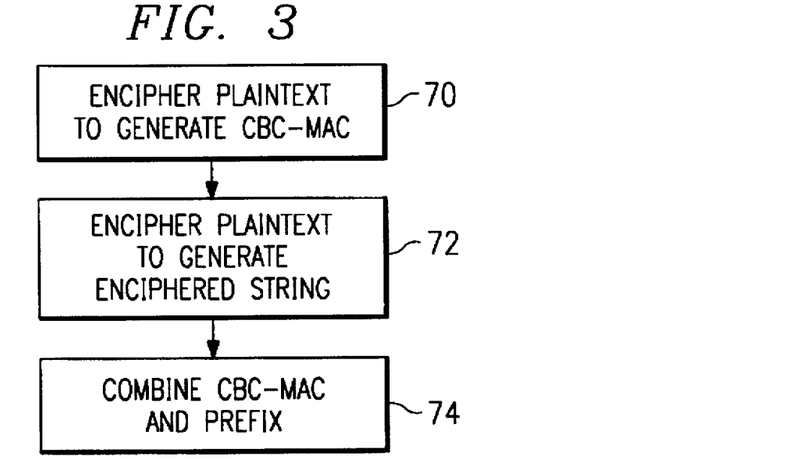
FIG. 3 illustrates a simplified flow diagram of a method of the invention for encrypting a plaintext into ciphertext.

Turning now to FIG. 3, the preferred method for encrypting a plaintext string into ciphertext is illustrated by means of a flow diagram. It is assumed that the encrypting party and the decrypting party share a pair of secret keys (i.e. a first and a second key). At step 70, the plaintext string is cipher block chained using the first (secret) key and a null initialization vector (IV) to generate a CBC message authentication code (MAC) that is the (entire) last block of ciphertext. At step 72, the plaintext string is again cipher block chained, now using the second (secret) key and the CBC-MAC (generated in step 70) as the initialization vector, to thereby generate an enciphered string. At step 74, the CBC-MAC (generated in step 70) and a portion of the enciphered string (generated in step 72) are then combined to create the ciphertext. The portion of the enciphered string is also referred to as a "prefix". This combination is further a function of the first key.

Figure 4:
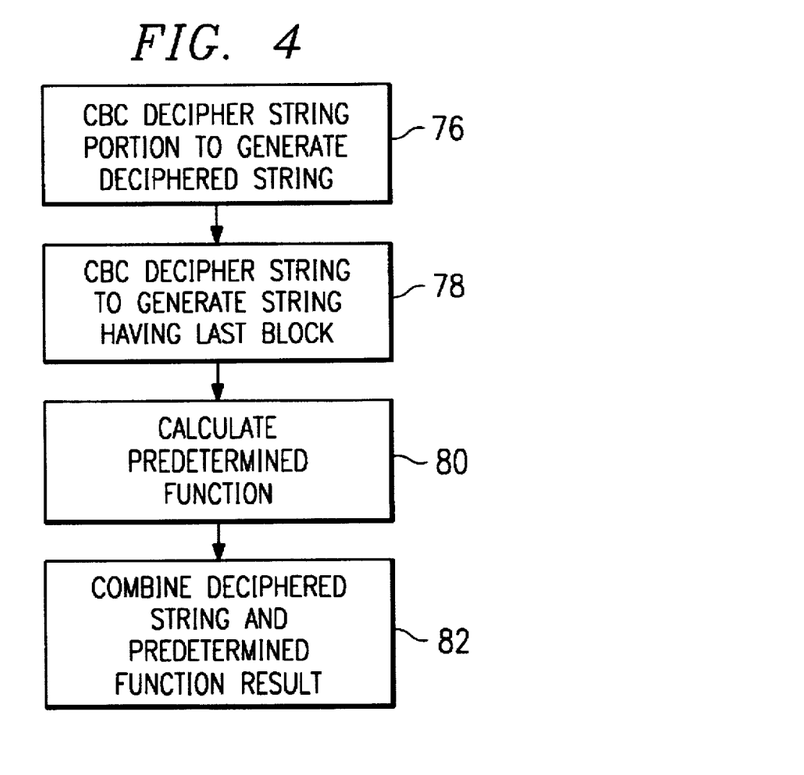
FIG. 4 illustrates a simplified flow diagram illustrating how the ciphertext (generated in FIG. 3) is converted back to plaintext.

Decryption of the ciphertext (generated by the routine of FIG. 3) is illustrated in FIG. 4. At step 76, the enciphered string (generated in step 72) is decrypted by cipher block chaining using the second secret key and the CBC-MAC (generated in step 70) as the initialization vector. Step 76 generates a deciphered string. At step 78, the deciphered string is then cipher block chained using the first key and a null IV to generate another string having a last block. At step 80, a predetermined function of this last block and the inverse of the block cipher at the CBC-MAC (generated in step 70) under the first key is then calculated. The plaintext is then formed at step 82 as the combination (i.e., the concatenation) of the deciphered string and the result of the predetermined function.

Figure 5A:
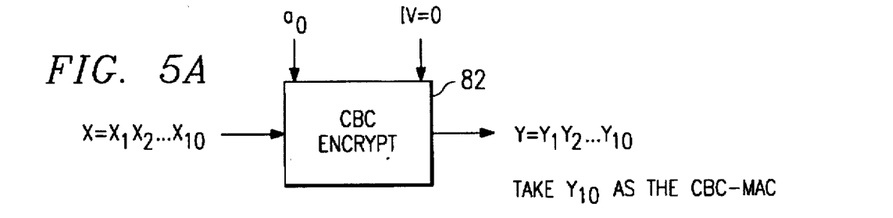
FIG. 5A illustrates step 70 of FIG. 3.
Figure 5B:
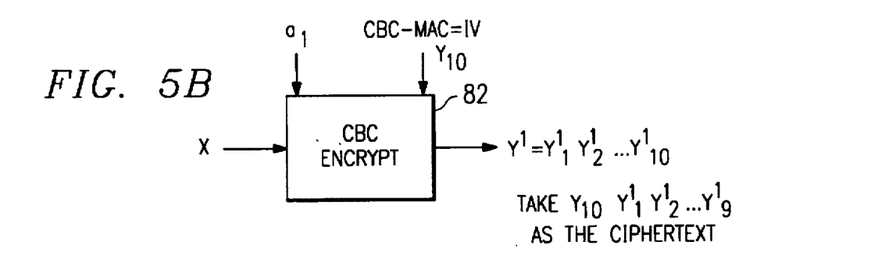
FIG. 5B illustrates step 72 of FIG. 3.

The operations in each of the steps 70 and 72 of the encryption routine are illustrated in FIGS. 5A and 5B, respectively. The routine uses an l-bit block cipher f (like DES) with key length k. We writer $f_a(x)$ for the l-bit string which is the block cipher's value applied to the l-bit x using the k-bit key a. Further, as noted above, it is assumed at the outset that the first and secret keys $a_o$ and $a_1$ are available to the routine and that $|a_1|=|a_1|=k$. The keys can be derived from some underlying k-bit key K using standard key separation techniques. For example, $a_o$ could be the first k bits of $f_K(0)$ and $a_1$ could be the first k bits of $f_K(1)$. In FIG. 5A, the plaintext string consists of the message string x, which for illustrative purposes is assumed to be comprised of ten (10) blocks of sixty-four (64) bits each, or 640 bits total. The message string is thus $x=x_1x_2 \ldots x_{10}$. This string is applied to the cipher block chaining encryption routine 82, which also receives the first key $a_o$ and a null initialization vector (i.e., IV=0). The result of the cipher block chaining routine 82 is an output string $y=y_1y_2 \ldots y_{10}$. The last block $y_{10}$ is the 64-bit cipher block chaining message authentication code or "CBC-MAC". This completes the first pass of the routine.

The second pass is shown in FIG. 5B wherein the message string (i.e., the plaintext) is again supplied to the cipher block chaining encryption routine 82. However, in this pass, the key used by the routine is the second (secret) key $a_1$, and the initialization vector is the CBC-MAC (i.e., $y_{10}$) generated in the first pass illustrated in FIG. 5A. The resulting enciphered string is called $y'=y'_1y'_2 \ldots y'_{10}$. This processing completes the second pass. Note that although the block cipher f shown in FIGS. 5A and 5B is shown to be the same, this is not required. The ciphertext is then taken to be the combination (e.g., by concatenation) of the CBC-MAC and a portion of the enciphered string, namely:

$$\text{ciphertext}=y_{10}\|y'_1y'_2 \ldots y'_9$$

The routine is length preserving since the length of the ciphertext is the same as the length of the plaintext string.

To decrypt the 10-block string y, we first consider it to be a sequence of blocks:

$$y_{10}\|y'_1y'_2 \ldots y'_9.$$

Figure 5C:
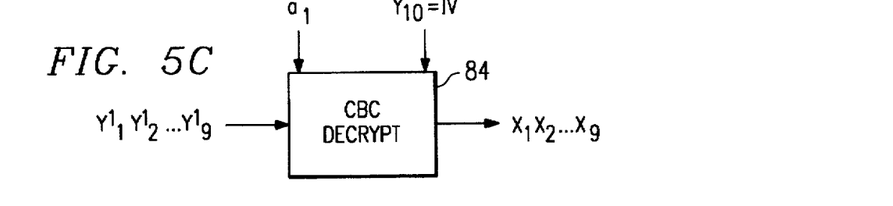
FIG. 5C illustrates step 76 of FIG. 4.
Figure 5D:
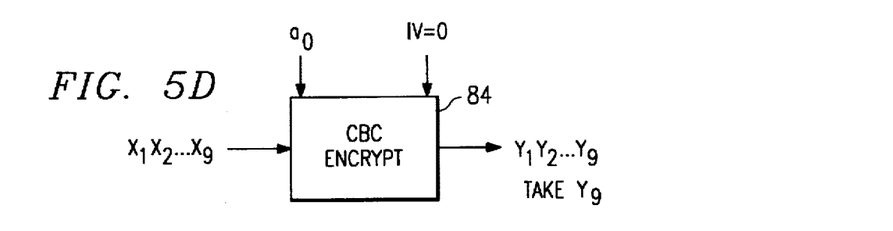
FIG. 5D illustrates step 78 of FIG. 4.
Figure 5E:
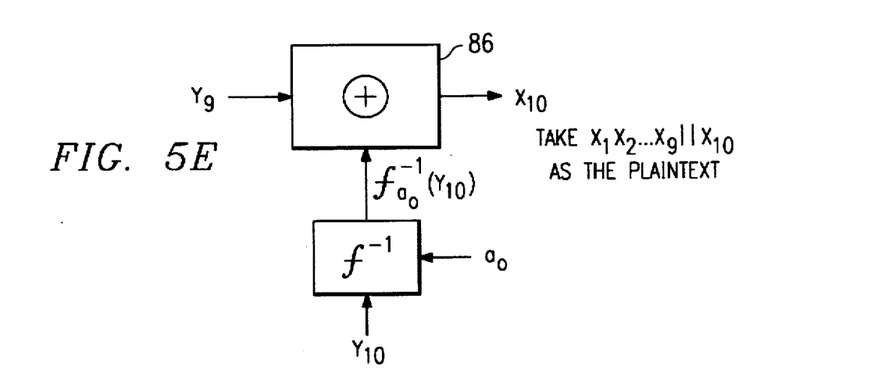
FIG. 5E illustrates step 80 of FIG. 4.

The operations in each of the steps 76, 78 and 80 of the decryption routine are then as illustrated in FIGS. 5C, 5D and 5E, respectively. As shown in FIG. 5C, step 76 involves CBC decryption 84 of the enciphered string $y'_1y'_2 \ldots y'_9$ (generated in step 72) with the second key $a_1$ and the CBC-MAC (i.e., $y_{10}$) as the IV. The resulting deciphered string is $x_1x_2 \ldots x_9$, which represents almost all of the original plaintext. To recover $x_{10}$, the decryption routine first carries out the operation shown in FIG. 5D, wherein the deciphered string $x_1x_2 \ldots x_9$ is cipher block encrypted (by CBC 84) using the first key $a_o$ and a null IV to generate a string $y_1y_2 \ldots y_9$ having a last block $y_9$. As seen in FIG. 5E, a predetermined function 86 (e.g., an XOR) of $y_9$ and an inverse function of the block cipher f under the first key $a_o$ at the point $y_{10}$ is then calculated to generate $x_{10}$. The plaintext is then seen as the following:

$$\text{plaintext}=x_1x_2 \ldots x_9\|x_{10}$$

The preferred implementation illustrated above utilizes cipher block chaining as the mode of operation for the block cipher in steps 72 and 76. The invention, however, is not so limited, as other modes of operation may also be used for these steps. Moreoever, although cipher block chaining is preferably used in the first pass (step 70) over the plaintext to create the message authentication code, it should be appreciated that other known techniques for producing MAC's (or other block cipher chaining modes) could be substituted in this step instead of CBC. (All that is necessary is that, given the l-bit MAC of m and all but particular l-bits of m, those missing l-bits can be efficiently and uniquely reconstructed). Thus, according to the invention it is envisioned that the first pass that processes the plaintext string involves a known technique that uses the first key $a_o$ for computing a message authentication code or tag. As discussed above, the second pass then involves using this MAC as an IV along with a second key $a_1$ to encrypt the message into an enciphered string. This second pass can be performed using CBC, but this is not required. The MAC and a portion of the enciphered string is then taken as the ciphertext.

Thus, in accordance with the more general aspects of the invention, encryption involves using the plaintext string and a first key to compute a message authentication code. The routine continues by using the message, a second key, and the message authentication code to produce an enciphered string that depends substantively on the message authentication code. As used herein, such "substantive" dependence means that all bits of the enciphered string may vary as the MAC takes on different values. The ciphertext of the plaintext is then taken to comprise the message authentication code together with some piece of the enciphered string. To reverse the process, the decryption routine involves using the enciphered string portion of the ciphertext, the second key and the MAC to generate a deciphered string. Decryption continues by using the deciphered string and the first key to produce a string having a last block. A predetermined function of the last block and the inverse of the block cipher under the first key at the MAC is then computed. The plaintext is then taken as the deciphered string and the result of the predetermined function.

A more detailed implementation of the invention is now set forth. This implementation processes message strings whether or not the length of the particular string being processed is equal to or a fraction of a desired block length. The method begins by selecting a l-bit block cipher f with key length k. For example, l is 64 when f is the DES algorithm. Of course, other block ciphers (e.g., IDEA or SKIPJACK) besides DES may be used as well. Let the encryption key be $a=(a_0,a_1)$, with $|a_0|=|a_1|=k$, and let $\lambda$ denote the empty string (with $0^0=\lambda$). Secret keys $a_0$ and $a_1$ should be unrelated to each other (at least with respect to practical computation). Let $(m)$ denote the encoding of the number $m<2^l$ into an l-bit block. For a string $m=m_1 \ldots m_s$, consisting of s blocks, each of l-bits, the (l-bit) CBC-MAC of m under $a_0$ is then defined by:

$$f_{a_0}^{(s)}(m) = f_{a_0}(f_{a_0}( \ldots (f_{a_0}(m_1) \oplus m_2) \oplus \ldots \oplus m_{s-1}) \oplus m_s).$$

Now suppose x is the message we want to encrypt and $1 \leq |x| < 2^l$. Let $x=x_1 \ldots x_{n-1}x_n$ be the message to be encrypted, with $|x_1|= \ldots =|x_{n-1}|=l$ and $|x_n| \leq l$. Note the assumption $|x_1| \geq 1$ implies that there is at least one "full" block to encrypt. The following method is not to be applied to messages of length less than l. Let $$x'=(|x|) x_1 \ldots x_{n-3} x_{n-2} x_n 0^{l-|x_n|} x_{n-1}.$$

The above step first pads the message string with trailing zeros to insure that the overall length of the string being encrypted is a multiple of the block length, and then it swaps the (previously short) last block of x with the second-to-last (full) block of x. (This step is not required if the length of the message is a multiple of the block length). Now let $$x^* = x_1 \ldots x_{n-2} x_n.$$

Note that $|x^*|=|x|-l$.

The encryption scheme $E_a(.)$ is as follows:

● Step 1. Let $t=f_{a_0}^{(n+1)}(x')$ be the l-bit CBC-MAC of $x'$ under $a_0$.

● Step 2. Encipher $x^*$ as follows. Let $y_0=t$ (i.e., the initialization vector). Then for $i=1, \ldots, n-2$ let $y_i = f_{a_1}(x_i \oplus y_{i-1})$ Finally, if $|x_n|=l$ let $y_n = f_{a_1}(x_n \oplus y_{n-2})$; else (i.e. $1 \leq |x_n| < l$) let $y_n$ be the XOR of $x_n$ with the first $|x_n|$ bits of $f_{a_1}(y_{n-2})$. This encryption method is an extension of the CBC mode of operation to allow for variable-length blocks. (When the block cipher is DES, this method has been called the IBM CUSP/3848 mechanism).

● Step 3. Define $E_a(x)=t \ y_1 \ldots y_{n-2} \ y_n$. That is, the encryption of x is t together with the enciphered text from Step 2.

Decryption is done as follows, with $y=t \ y_1 \ldots y_{n-2} \ y_n$ the received ciphertext:

● Step 1. Recover $x^*$ by deciphering under key $a_1$ the ciphertext $y_1 \ldots y_{n-1} \ y_n$. That is, let $y_0=t$ and for $i=1, \ldots, n-2$ let $x_i=f^{-1}(y_i) \oplus y_{i-1}$. Then, if $|y_n|=l$, then let $x_n=a_1$ $f^{-1}(y_n) \oplus y_{n-2}$; else (i.e. $1 \leq |y_n| < l$) let $x_n$ be the $a_1$ XOR of $y_n$ with the first $|y_n|$ bits of $f_{a_1}(y_{n-2})$.

● Step 2. To recover $x_{n-1}$, let $t'=f_{a_0}^{(n)}(|y|x_1 \ldots x_{n-2} x_n 0^{l-|x_n|})$ and let $x_{n-1}=f_{a_0}^{-1}(t) \oplus t'$.

The recovered plaintext is $x_1 \ldots x_n$.

The present invention provides significant advantages in that the encryption is length-preserving, non-stateful, deterministic and secure. Related encryption methods can be designed in order to achieve not only these initial set of requirements but further to insure that the methods are fully parallelizable, either in hardware or in software. For example, the MAC t can be computed by a "tree MAC" scheme as described in U.S. Pat. No. 4,933,969 to Marshall et al., incorporated herein by reference. Then, the encipherment may involve simply XORing the message x with the length-|x| prefix of $f_a(t) \ f_a((t+1)\text{mod}2^l) \ f_a((t+2)\text{mod}2^l) \ldots$. Under such an embodiment, doubling the number of processors effectively doubles the rate at which the enciphered text can be computed.

The particular applications of the methods detailed herein are quite varied. For example, the techniques are useful for encrypting a field of a protocol data unit, encrypting a file in a manner independent of the "i-node" of the file, or encrypting a disk sector independent of the position of the sector in the physical media. The first example typically arises when there is some fixed communications protocol that has left some number of message bits available, yet provided no security. It is desired to add security but without changing the number of bits of each field. In other words, it is desired to be able to send, encrypted, all of the message which was formally transmitted in the clear.

It should be appreciated by those skilled in the art that the specific embodiments disclosed above may be readily utilized as a basis for modifying or designing other routines for carrying out the same purposes of the present invention. Those skilled in the art will recognize that such equivalent techniques and embodiments do not depart from the spirit and scope of the invention as set forth in the appended claims.

What is claimed is:

1. A computer-implemented method, using first and second keys, to encrypt a plaintext string x to a ciphertext string F, comprising the steps of:

using the string x and the first key $a_0$ to compute a message authentication code t;

using the string x, the second key $a_1$, and the message authentication code t to produce an enciphered string y' that depends substantively on the message authentication code; and taking the ciphertext y to comprise the message authentication code t together with a predetermined piece of the enciphered string y'.

2. The computer-implemented method as described in claim 1 wherein said predetermined piece is shorter than y' yet the plaintext string is still uniquely recoverable given the ciphertext.

3. The computer-implemented method as described in claim 1 wherein the message authentication code is computed by cipher block chaining a block cipher.

4. The computer-implemented method as described in claim 2 wherein the block cipher is DES.

5. The computer-implemented method as described in claim 2 wherein the predetermined piece of the enciphered string includes all but a last block of the enciphered string.

6. The computer-implemented method as described in claim 2 wherein the message authentication code has a length equal to a block length.

7. A method, using first and second keys, to encrypt a plaintext string to a ciphertext string, comprising the steps of:

(a) cipher block chaining (CBC) the plaintext string using the first key and a first initialization vector (IV) to generate a CBC message authentication code whose length is equal to a block length;

(b) cipher block chaining the plaintext string using the second key and the CBC message authentication code as a second initialization vector to generate an enciphered string; and (c) combining the CBC message authentication code and a predetermined portion of the enciphered string to form the ciphertext string.

8. The method as described in claim 7 wherein the predetermined portion of the enciphered string includes all but a last block of the enciphered string.

9. The method as described in claim 7 wherein the first initialization vector is the null vector.

10. The method as described in claim 7 wherein the plaintext string has a length that is a multiple of a length of a block.

11. The method as described in claim 7 wherein the plaintext string has a length that is not equal to a multiple of a length of a block.

12. The method as described in claim 7 wherein step (c) concatenates the CBC message authentication code and the predetermined portion of the enciphered string to form the ciphertext string.

13. The method as described in claim 7 wherein the ciphertext string has a length equal to the plaintext string.

14. The method as described in claim 7 wherein the first and second keys are derived from an underlying secret key.

15. A method, using first and second keys and a block cipher, to decrypt a ciphertext string into a plaintext string, the ciphertext string comprising a CBC message authentication code and an enciphered string, comprising the steps of:

(a) decrypting by cipher block chaining the enciphered string using the second key and the CBC message authentication code as an initialization vector to generate a deciphered string;

(b) cipher block chaining the deciphered string using the first key and a null initialization vector to generate a string having a last block;

(c) calculating a predetermined function of the last block and an inverse of the block cipher under the first key at the CBC message authentication code; and (d) combining the deciphered string and a result of the predetermined function to generate the plaintext string.

16. The method as described in claim 15 wherein the block cipher is DES.

17. The method as described in claim 15 wherein the predetermined function in step (c) is an exclusive OR.

18. A computer apparatus, comprising:

a storage device;

program means supported in the storage device for encrypting a plaintext string x to a ciphertext string y, the program means comprising:

means for using the string x and a first key $a_0$ to compute a message authentication code t;

means for using the string x, a second key $a_t$, and the message authentication code t to produce an enciphered string y'; and means for taking the ciphertext y to comprise the message authentication code t together with a predetermined piece of the enciphered string y', where said predetermined piece is shorter than y'.

19. A computer, comprising:

a storage device;

program means supported in the storage device for decrypting a ciphertext string into a plaintext string, the ciphertext string comprising a CBC message authentication code and an enciphered string, the program means comprising:

means for decrypting the enciphered string by cipher block chaining the enciphered string using a secret key and the CBC message authentication code as an initialization vector to generate a deciphered string;

means for cipher block chaining the deciphered string using a second secret key and a null initialization vector to generate a string having a last block;

means for calculating a predetermined function of the last block and an inverse of a block cipher evaluated using the second secret key; and means for combining the deciphered string and the predetermined function to generate the plaintext string.

20. A program storage device readable by a processor and tangibly embodying a program of instructions executable by the processor to perform encryption and decryption methods, using first and second keys and a block cipher, wherein the encryption method comprises the steps of:

(a) cipher block chaining (CBC) a plaintext string using the first key and an initialization vector (IV) to generate a CBC message authentication code;

(b) cipher block chaining the plaintext string using the second key and the CBC message authentication code as the initialization vector to generate an enciphered string; and (c) combining the CBC message authentication code and a portion of the enciphered string to form a ciphertext string;

and wherein the decryption method comprises the steps of:

(a) cipher block chaining the enciphered string using the second key and the CBC message authentication code as the initialization vector to generate a deciphered string;

(b) cipher block chaining the deciphered string using the first key and a null initialization vector to generate a string having a last block;

(c) calculating a predetermined function of the last block and an inverse of the block cipher under the first key at the CBC message authentication code; and (d) combining the deciphered string and the predetermined function to generate the plaintext string.

* * * * *

UNITED STATES PATENT AND TRADEMARK OFFICE
CERTIFICATE OF CORRECTION

PATENT NO : 5,673,319
DATED : September 30, 1997
INVENTOR(S) : Bellare et al

It is certified that error appears in the above-identified patent and that said Letters Patent is hereby corrected as shown below:

Column 7, line 24, please delete "$f_{a0}^{(s)}$" and insert --$f_{a0}^{(s)}$-- ;

7, line 26, please delete "1 $\leq$" and insert -- $l \leq$ --;
7, line 27, please delete "=1" and insert -- $= l$ --;
7, line 27, please delete "| $\leq$1" and insert -- $| \leq l$ --;
7, line 28, please delete "| $\geq$1" and insert -- $| \geq l$ --;
7, line 44, please delete "=1" and insert -- $= l$ --;
7, line 46, please delete "$f_{a0}^{(n+1)}$" and insert --$f_{a0}^{(n+1)}$-- ;

7, line 46, please delete "1-bit" and insert -- $l$-bit--;
7, line 50, please delete "| =1" and insert -- $| = l$ --;
7, line 50, please delete "1 $\leq$ |x$_n$|<1)  and insert -- 1 $\leq$ |x$_n$|< $l$ )--;
7, line 63, please delete "=1" and insert -- $= l$ --;
7, line 64, please delete "1 $\leq$ |y$_n$|<1)" and insert -- 1 $\leq$ |y$_n$|< $l$ )--;
7, line 66, please delete - $f_{a_0}^{(n)}$ and insert -- $f_{a_0}^{-1}$ -- ;

7, line 67, please delete $f_{a_0}^{(n)}$ and insert - $f_{a_0}^{-1}$ -- ;
8, line 38, please delete "F," and insert --y,--.

Signed and Sealed this

Seventh Day of September, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO : 5,673,319
DATED : September 30, 1997
INVENTOR(S) : Bellare, et al.

It is certified that error appears in the above-identified patent and that said Letters Patent are hereby corrected as shown below:

Claim 1, line 38, change "F" to --y --.

Signed and Sealed this

Seventh Day of November, 2000

Attest:

Q. TODD DICKINSON

*Attesting Officer*      *Director of Patents and Trademarks*